US008977978B2

(12) United States Patent
Cho et al.

(10) Patent No.: US 8,977,978 B2
(45) Date of Patent: Mar. 10, 2015

(54) OUTLINE VIEW

(75) Inventors: Peter S. Cho, San Francisco, CA (US); Anne K. Halsall, San Francisco, CA (US); Aaron Haney, San Francisco, CA (US); Robert Benjamin Scott, San Francisco, CA (US); Jonathan Wight, Emeryville, CA (US); Robert Cromwell, San Francisco, CA (US); Charles M. MacInnis, San Francisco, CA (US); Joshua John Forman, San Francisco, CA (US)

(73) Assignee: Inkling Systems, Inc., San Francisco, CA (US)

( * ) Notice: Subject to any disclaimer, the term of this patent is extended or adjusted under 35 U.S.C. 154(b) by 312 days.

(21) Appl. No.: 13/323,793

(22) Filed: Dec. 12, 2011
(Under 37 CFR 1.47)

(65) Prior Publication Data
US 2013/0151974 A1    Jun. 13, 2013

(51) Int. Cl.
*G06F 3/048* (2013.01)

(52) U.S. Cl.
USPC ........... 715/776; 715/733; 715/781; 715/784; 715/799; 715/798

(58) Field of Classification Search
CPC ..... G06F 3/048; G06F 3/0484; G06F 3/0481; G06F 3/0485; G06F 3/0488; G06F 3/04883; G06F 3/0482
USPC .......................... 715/733, 781, 784, 799, 798
See application file for complete search history.

(56) References Cited

U.S. PATENT DOCUMENTS

| | | | | |
|---|---|---|---|---|
| 5,263,174 A * | 11/1993 | Layman | ........................ | 715/841 |
| 5,485,174 A * | 1/1996 | Henshaw et al. | ............. | 345/684 |
| 5,487,140 A * | 1/1996 | Toya | ............................. | 345/641 |
| 5,497,170 A * | 3/1996 | Kato et al. | ......................... | 345/9 |
| 5,680,153 A * | 10/1997 | Watanabe | ..................... | 345/470 |
| 5,857,066 A * | 1/1999 | Wyche et al. | ................. | 345/420 |
| 6,320,583 B1 * | 11/2001 | Shaw et al. | .................... | 345/619 |
| 7,162,488 B2 * | 1/2007 | DeVorchik et al. | .................. | 1/1 |
| 7,769,794 B2 * | 8/2010 | Moore et al. | .................. | 707/831 |
| 2003/0065642 A1 | 4/2003 | Zee | | |
| 2005/0132281 A1 | 6/2005 | Pan et al. | | |
| 2007/0028270 A1* | 2/2007 | Ostojic et al. | ................... | 725/53 |
| 2008/0155479 A1* | 6/2008 | Long et al. | .................... | 715/854 |

(Continued)

OTHER PUBLICATIONS

MyWindowsClub—What is Window Explorer Preview Pane in Windows 7, Posted Sep. 14, 2010.*

(Continued)

*Primary Examiner* — Doon Chow
*Assistant Examiner* — David Choi
(74) *Attorney, Agent, or Firm* — Ascenda Law Group, PC

(57) ABSTRACT

Disclosed in some examples are methods, systems, and machine readable mediums for creating and presenting an outline view, the outline view including a first user navigable graphical panel, the first panel displaying first organizational elements corresponding to a first outline level of an electronic content work; a second user navigable graphical panel, the second panel displaying one or more child organizational elements of a selected first organizational element, the child organizational elements corresponding to a second outline level of the electronic content work; and one or more content previews of content within the electronic content work in the first or second panel, the content previews corresponding to the first or second outline levels of the electronic content work, respectively.

7 Claims, 9 Drawing Sheets

(56) References Cited

U.S. PATENT DOCUMENTS

| | | | |
|---|---|---|---|
| 2008/0168073 A1 | 7/2008 | Siegel et al. | |
| 2010/0278453 A1 | 11/2010 | King | |
| 2011/0202877 A1* | 8/2011 | Lassonde et al. | 715/817 |
| 2011/0242007 A1* | 10/2011 | Gray et al. | 345/173 |
| 2012/0019555 A1* | 1/2012 | Hicken | 345/629 |
| 2012/0084725 A1* | 4/2012 | Sirpal et al. | 715/802 |

OTHER PUBLICATIONS

Grolier 2001 Multimedia Encyclopedia Deluxe Edition.*
Microsoft Encarta Encyclopedia Deluxe 2001.*
"About the Wolfram Demonstrations Project", Wolfram Demonstrations Project & Contributors, 2012 [retrieved on Jan. 4, 2012]. Retrieved from the Internet: <URL: http://demonstrations.wolfram.com/about.html >, 3 pgs.
"Advanced Calculations", [online video] TutorTrove.com, 2011 [retrieved on Feb. 24, 2012]. Retrieved from the Internet: <URL: https://tutor-trove.tenderapp.com/kb/welcome-to-tutor-trove/whiteboard-video-tutorials-equations-graphing >, .avi file (10,692 KB), 1 minute, 50 seconds.
U.S. Appl. No. 12/731,656, filed Feb. 21, 2012 to Non Final Office Action mailed Nov. 2, 2011, 10 pgs.
U.S. Appl. No. 12/731,656, Examiner Interview Summary mailed Feb. 15, 2012, 4 pgs.
U.S. Appl. No. 12/731,656, Non Final Office Action mailed Nov. 2, 2011, 20 pgs.
"Biology Software: PopBio", [online] Reed College, 2008 [retrieved on May 24, 2011]. Retrieved from the Internet: <URL: http://academic.reed.edu/biology/software.html>, 1 pg.
"Desmos Startup Battlefield Presentation", [online video] Techcrunch.com, 2011 [retrieved on Feb. 24, 2012]. Retrieved from the Internet: <URL: http://techcrunch.com/2011/05/24/build-and-share-rich-educational-content-with-desmos/ >, .avi file (584,866 KB), 9 minutes, 40 seconds.
"Desmos: About Us", [retrieved on Aug. 3, 2011]. Retrieved from the Internet: <URL: http://www.desmos.com/about >, 1 pg.
"Desmos: Blog", [retrieved on Aug. 3, 2011]. Retrieved from the Internet: <URL: http://blog.desmos.com >, 6 pgs.
"Desmos: Frequently Asked Questions", [retrieved on Aug. 3, 2011]. Retrieved from the Internet: <URL: www.desmos.com/faqs >, 2 pgs.
"Fall Improvements Part 2", TutorTrove.com, 2010 [retrieved on Feb. 24, 2012]. Retrieved from the Internet: <URL: https://tutor-trove.tenderapp.com/kb/version-updates/fall-tweaks-part-2 >, 9 pgs.
"Fall Tweaks Part 1", TutorTrove.com, 2010 [retrieved on Feb. 24, 2012]. Retrieved from the Internet: <URL: https://tutor-trove.tenderapp.com/kb/version-updates/fall-tweaks-part-1-september-14-2010, 11 pgs.
"Graphs", [online video] TutorTrove.com, 2011 [retrieved on Feb. 24, 2012]. Retrieved from the Internet: <URL: https://tutor-trove.tenderapp.com/kb/welcome-to-tutor-trove/whiteboard-video-tutorials-equations-graphing >, .avi file (10,439 KB), 1 minute, 44 seconds.
"Kindle Now Sharing Your Highlights", [retrieved on Aug. 18, 2011]. Retrieved from the Internet: <URL: http://sylishlybookish.wordpress.com/2010/05/05/kindle-now-sharing-your-highlights/ >, (May 5, 2010), 4 pgs.
"Mag+", [online video] Bonnier AB, 2010 [retrieved on Feb. 24, 2012]. Retrieved from the Internet: <URL: http://vimeo.com/8217311>, .mp4 file (610,247 KB), 8 minutes, 4 seconds.
"Mag+", Bonnier AB, 2010 [retrieved on Feb. 24, 2012]. Retrieved from the Internet: <URL: http://vimeo.com/8217311>, 17 pgs.
"Math Geeks, Rejoice! The Desmos Graphing Calculator Is Here, It's Online and It's Free", [Online Video]. [retrieved on Aug. 3, 2011]. Retrieved from the Internet: <URL: http://techcrunch.com/2011/06/24/desmos-graphing-calculator/ >, .avi file (57,656 KB), 1 minute, 8 seconds.
"Math Geeks, Rejoice! The Desmos Graphing Calculator Is Here, It's Online and It's Free", [retrieved on Aug. 3, 2011]. Retrieved from the Internet: <URL: http://techcrunch.com/2011/06/24/desmos-graphing-calculator/ >., 1 pg.
"Online Tutoring", [retrieved on Feb. 24, 2012]. Retrieved from the Internet: <URL: http://www.tutortrove.com/services.php >, 1 pg.
"Orbit3d for Mac", Version: 1.0, [online] cnet download.com, Date added: Mar. 24, 2003 [retrieved on Aug. 10, 2011]. Retrieved from the Internet: <URL: http://download.cnet.com/Orbit3d/3000-2054_4-10071019.html>, 8 pgs.
"Plotting Points", [online video] TutorTrove.com, 2011 [retrieved on Feb. 24, 2012]. Retrieved from the Internet: <URL: https://tutor-trove.tenderapp.com/kb/welcome-to-tutor-trove/whiteboard-video-tutorials-equations-graphing >, .avi file (17,795 KB), 2 minutes, 54 seconds.
"Share Kindle Highlights on Facebook", [retrieved on Aug. 18, 2011]. Retrieved from the Internet: <URL: http://webbishbooks.com/2010/09/share-kindle-highlights-on-facebook >, (Sep. 9, 2010), 2 pgs.
"Simplified Scheduling", TutorTrove.com, 2011 [retrieved on Feb. 24, 2012]. Retrieved from the Internet: <URL: www.tutortrove.com/services.php >, 1 pg.
"Student Tutorial", TutorTrove.com, 2011 [retrieved on Feb. 24, 2012]. Retrieved from the Internet: <URL: https://tutor-trove.tenderapp.com/kb/welcome-to-tutor-trove/student-tutorial >, 4 pgs.
"Student Tutorial", [online video] TutorTrove.com, 2011 [retrieved on Feb. 24, 2012]. Retrieved from the Internet: <URL: https://tutor-trove.tenderapp.com/kb/welcome-to-tutor-trove/student-tutorial >, .avi file (6,805 KB), 58 seconds.
"Tangent to a Curve", [online] Wolfram Demonstrations Project & Contributors, 2009 [retrieved on May 24, 2011]. Retrieved from the Internet: <URL: http://demonstrations.wolfram.com/TangentToACurve/>, 2 pgs.
"The Basics for Tutors", TutorTrove.com, 2011 [retrieved on Feb. 24, 2012]. Retrieved from the Internet: <URL: https://tutor-trove.tenderapp.com/kb/getting-started/the-basics-for-tutors?sso= >, 7 pgs.
"Tutor Trove Feature Demo", TutorTrove.com, 2011 [retrieved on Mar. 7, 2012]. Retrieved from the Internet: <URL: http://www.tutortrove.com/popup_video.php?id=3 >, 1 pg.
"Tutor Trove Feature Demo", [online video] TutorTrove.com, 2011 [retrieved on Feb. 24, 2012]. Retrieved from the Internet: <URL: http://www.tutortrove.com/popup_video.php?id=3 >, .avi file (42,255 KB), 2 minutes, 15 seconds.
"Tutor Trove Services: Manage Your Users", [retrieved on Feb. 24, 2012]. Retrieved from the Internet: <URL: http://www.tutortrove.com/services.php >, 1 pg.
"Tutor Trove Support: About Users", [retrieved on Aug. 3, 2011]. Retrieved from the Internet: <URL: https://tutor-trove.tenderapp.com/kb/users/about-users>, 4 pgs.
"Tutor Trove Support: Equations", [retrieved on Feb. 24, 2012]. Retrieved from the Internet: <URL: https://tutor-trove.tenderapp.com/kb/the-whiteboard/equations >, 8 pgs.
"Tutor Trove Support: Graphing", [retrieved on Aug. 3, 2011]. Retrieved from the Internet: <URL: https://tutor-trove.tenderapp.com/kb/the-whiteboard/graphing >, 4 pgs.
"Tutor Trove Support: Navigating the Whiteboard", [retrieved on Feb. 24, 2012]. Retrieved from the Internet: <URL: https://tutor-trove.tenderapp.com/kb/the-whiteboard/navigating-the-whiteboard >, 7 pgs.
"Tutor Trove Support: Scheduling Sessions", [retrieved on Aug. 3, 2011]. Retrieved from the Internet: <URL: https://tutor-trove.tenderapp.com/kb/sessions/scheduling-sessions >, 5 pgs.
"Tutor Trove Support: Tutoring Services", [retrieved on Aug. 3, 2011]. Retrieved from the Internet: <URL: https://tutor-trove.tenderapp.com/kb/services-locations/tutoring-services >, 6 pgs.
"Tutor Trove Support: Your Menu", [retrieved on Aug. 3, 2011]. Retrieved from the Internet: <URL: https://tutor-trove.tenderapp.com/kb/navigating-your-tutor-trove-site/your-menu >, 6 pgs.
"Tutor Trove: Testimonials", [retrieved on Aug. 3, 2011]. Retrieved from the Internet: <URL: http://www.tutortrove.com/testimonials.php >, 2 pgs.
"Version Update Feb. 21, 2011!", TutorTrove.com, 2011 [retrieved on Feb. 24, 2012]. Retrieved from the Internet: <URL: https://tutor-trove.tenderapp.com/kb/version-updates/version-update-february-21/2011>, 9 pgs.

(56) References Cited

OTHER PUBLICATIONS

"Whiteboard Video Tutorials—Equations & Graphing", [retrieved on Aug. 3, 2011]. Retrieved from the Internet: <URL: https://tutor-trove.tenderapp.com/kb/welcome-to-tutor-trove/whiteboard-video-tutorials-equations-graphing?sso >, 10 pgs.

"Whiteboard Video Tutorials—Files & Images", [retrieved on Aug. 3, 2011]. Retrieved from the Internet: <URL: https://tutor-trove.tenderapp.com/kb/welcome-to-tutor-trove/whiteboard-video-tutorials-files-images >, 6 pgs.

"Whiteboard Video Tutorials—Manipulating Shapes", [retrieved on Aug. 3, 2011]. Retrieved from the Internet: <URL: https://tutor-trove.tenderapp.com/kb/welcome-to-tutor-trove/whiteboard-video-tutorials-manipulating-shapes >, 8 pgs.

Boog, J., "How to Copy, Paste & Share Your Kindle Highlights", [retrieved on Aug. 18, 2011]. Retrieved from the Internet: <URL: http://www.mediabistro.com/galleycat/how-to-copy-paste-your-kindle-kighlights_b22950 >, (Aug. 8, 2011), 4 pgs.

Empson, R., "Build and Share Rich Educational Content With Desmos", [retrieved on Mar. 7, 2012]. Retrieved from the Internet: <URL: http://techcrunch.com/2011/05/24/build-and-share-rich-educational-content-with-desmos/ >, (May 24, 2011), 1 pg.

Freeman, D., "Kindle Notes and Highlights Now Accessible on the Web", [retrieved on Aug. 18, 2011]. Retrieved from the Internet: <URL: http://techcrunch.com/2009/05/26/kindle-notes-and-highlights-now-accessible-on-the-web >, (May 26, 2009), 2 pgs.

Golden, A., "Orbit3D", [Online] sourcforge.net, 2002 [retrieved on Aug. 19, 2011]. Retrieved from the Internet: <URL: http://orbit3d.sourceforge.net/ >, 15 pgs.

Reid, Calvin, "Book Country Launches Self-Publishing Services", [Online]. Retrieved from Internet: <http://www.publishersweekly.com/pw/by-topic/industry-news/publisher-news/article/49523-book-country-launches-self-publishing-services.html>, (Accessed Nov. 18, 2011), 4 pgs.

\* cited by examiner

OUTLINE VIEW

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Inkling Systems, Inc., All Rights Reserved.

BACKGROUND

Traditional books utilize a table of contents that generally includes the titles or descriptions of the first level headers (e.g., chapter titles), the titles or descriptions of the second level headers, and sometimes even third level headers within the content, along with page numbers on which those headers begin. The table of contents can be a valuable tool for a reader as it allows a reader to quickly scan the contents and the organization of a book and to ascertain a page number that corresponds to a particular section. The table of contents is generally created manually once the contents of the book are determined.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
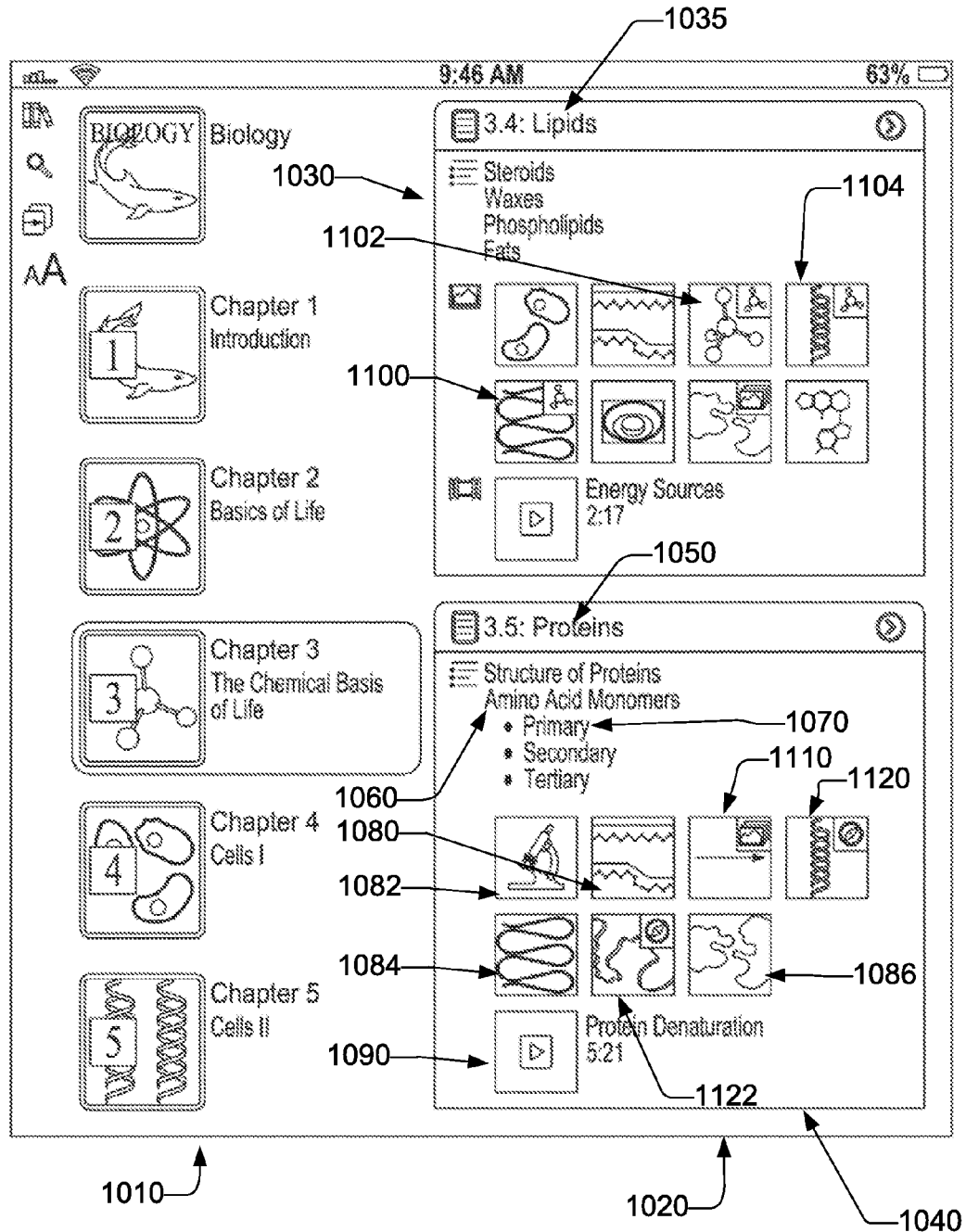
FIG. 1 shows an outline view, according to some examples of the present disclosure.

The traditional table of contents format is unsuitable for electronic media in that it fails to utilize the interactive capabilities inherent in present-day electronic client devices. Disclosed in some examples are systems, methods, and machine readable media for automatically creating and displaying dynamically generated, semantically rich, interactive outline views of electronic content on an electronic device. This outline view utilizes the rich media and interactive capabilities of the electronic devices to provide a navigable outline of the content and, in some examples, a number of content previews.

For example, an outline view may include a vertically-scrollable list of chapters in a first panel, which, in some embodiments, is in a first column of the screen of the electronic device. Selecting a particular chapter in the first panel may cause the various sections of that chapter to be displayed in a second vertically-scrollable panel occupying a second column adjacent the first column on the screen. Selecting one of the various sections in the second column may cause that particular section of the electronic content to be displayed. The various panels may contain one or more content previews which may allow the content user to preview the content associated with the electronic content work. Thus, for example, the panel displaying the various sections of the electronic content work may include previews of the various videos, figures, three-dimensional models or the like displayed next to the sections in which they are contained in the electronic content. In some examples, the outline view may be automatically created based upon the organization, structure, and content of the electronic content, and in some examples, the outline view automatically and dynamically updates itself when the electronic content updates.

Organization of the Electronic Content

The interactive electronic content may be organized into a directed graph structure (e.g., a tree structure). In some examples, this directed graph structure may be hierarchical. For example, the interactive electronic content may be organized into a series of one or more organizational levels (e.g., a chapter level, a section level, a sub-section level, or the like). Each organizational level may contain one or more organizational elements (e.g., one or more particular chapters—i.e., chapter 5, sections—i.e., section 5, sub-sections—i.e., section 5.5, or the like). Each organizational element may have one or more child organizational elements in a different (e.g., lower organizational level. For example, an organizational element may be a particular chapter, which may contain a number of child section organizational elements in the section organizational level. Each child section may have a number of associated children in the form of sub-sections, and the like. For example, if an electronic content work has two chapters and chapter one has two sections, each with one sub-section, and chapter two has one section with two sub-sections, the chapter organizational level would have two organizational elements—chapter 1 and chapter 2. The section organizational level would have three organizational elements—sections 1.1, 1.2, and 2.1. The sub-sectional organizational level would have four organizational elements—sub-sections 1.1.1, 1.2.1, 2.1.1, and 2.1.2.

An organizational element may describe one instance of any division of the electronic content within a particular organizational level. Organizational levels in some examples may be a grouping of one or more organizational elements of similar organizational scope. In some examples, various organizational levels may be defined such that the associated organizational elements within each successive organizational level may divide the electronic content into narrower and narrower portions. Thus, for example, the organizational structure may resemble a tree, with the highest organizational level describing the entirety of the content and subsequent organizational levels describing subsequently narrower scope. Displaying an organizational element may include displaying an associated description of that organizational element including one of or any combination of: a numeric identifier, a title, a graphical representation, or the like. For example, a chapter organizational element may be displayed as "Chapter 1," "1," "Chapter 1: Introduction," or the like.

While the disclosure contains references to chapters, sections, sub-sections, sub-sub-sections and the like, it will be apparent to one skilled in the art having the benefit of Applicants' disclosure that the organizational structure may be organized differently and may have different levels and differently named organizational elements. The organizational structure, the levels, and the organizational elements within a level may be determined by the content authors or other user. Thus, for example, the content creator may have higher organizational levels than chapters chapters may be organized into one or more units).

In some examples, the interactive electronic content may be organized into a single directed graph structure, but in other examples, there may be one or more alternative directed graph structures which may lead to one or more alternative outline views. In some examples, the alternative directed graph structures may share some or all of the organizational elements and sub-elements or may contain completely different organizational elements and sub-elements. Separate outline views may be created for each of the separate alternative directed graph structures. Thus it may be possible to present to content users different ways of organizing and navigating the electronic content. Content users may then choose which outline view to utilize which may best suit their needs. Both content users and content creators may specify alternative content orderings. For example, a content user may specify which portions of content they have purchased or will utilize. The system may then create an outline view only from those content portions. In other examples, a content user may specify a particular ordering of the content. For example, a content user may upload or enter a preferred content ordering (for example a syllabus for a class). This content ordering may then be used to customize the outline view such that the outline view ordering matches the preferred ordering (e.g., the chapters, sections, etc., may be presented out of order). In yet other examples a user may specify both the portions of the content they have purchased or will utilize and a preferred ordering.

Outline Panels

The outline view may be displayed to a user as part of one or more outline panels. The one or more user navigable outline panels of the outline view my be organized into columns or rows and may allow a user to browse through the various organizational levels of an outline of the electronic content work, view the various organizational elements at each level, and preview some of the electronic content within a particular outline level. Each outline panel may display the organizational elements of one or more organizational levels of the outline of the electronic content and may provide one or more content previews of the content within a particular level. Thus, for example, a first panel may display all of the first level organizational elements of the electronic content, which in some examples may be a list of chapters. A second panel may provide a list of all the second level organizational elements, which are children of a first level organizational element that is currently selected in the first panel (e.g., it may display the sections within that chapter). Additional panels may display additional levels which may provide a more granular view of the organizational hierarchy of the electronic content.

Each outline panel may be an independent element of a graphical user interface of a client application and may comprise a section of the screen where the organizational elements corresponding to a particular level (or levels) of the outline view and their associated content previews are displayed and/or interacted with. The panel may be movable as a result of one or more user interactions with the outline view. The panel boundaries may or may not be drawn and the panel itself may be opaque or transparent. The panel may provide for scrolling to view additional organizational elements not presently displayed.

In some examples, each panel may display only a single level of the organizational hierarchy, while in other examples, a single panel may display multiple levels of the organizational hierarchy. For example, a first panel may display the chapter organizational elements and the second panel may display both the headings within the selected chapter, the sub headings within all the headings, and the like. In some examples, the selection of a particular organizational element (e.g., a chapter) of the outline in one outline panel may constrain the contents of the next outline panel to the organizational elements that are children of the particular selected organizational element. Thus for example, a selection of a chapter in one panel may cause only the sections within that chapter to be displayed or highlighted in the next panel, while sections from other chapters are not displayed or greyed out and may not be interacted with.

Content Previews

In addition to displaying the various organizational elements, one or more of the panels of the outline may include one or more previews of one or more portions of the electronic content. Content previews may be any audio or visual display that may convey to the content user an indication of the presence of, and in some examples, the substance of, a particular portion of interactive content. A content preview may be or include portions of the content such as content clips or snippets, summaries of the content, highlights of the content, thumbnail images of the content, and the like. Example content previews include showing one or more portions of text for textual content, one or more video or image frames for audio-visual content, one or more sound clips for audio content, or the like. Each preview may also contain an indication as to what type of content it is. For example, a three-dimensional model may have an icon associated with it that is placed in proximity or onto the content preview that identifies that the content preview is a preview of a three-dimensional model.

In some examples, the content selected for preview in a particular panel may be any content in the electronic content work. In other examples, the content selected for preview in a particular panel may be constrained to content within that particular organizational level represented by the particular panel. Thus for example, if there are two panels, one chapter panel, and one section panel, the section panel may only display content previews for content located in the sections displayed in the section panel.

Additional rules may also be applied that specify the content to be previewed. Thus, for example, the rules may specify that all content except video should be previewed. In other examples, the rules may be more complicated in that they may specify that certain types of content should be shown in certain panels. Thus, for example, three-dimensional models may be previewed in a section panel, whereas images may be previewed in all panels. The rules may even specify particular content portions of particular electronic works. For example, a content creator may decide that particular videos in the content should not be previewed whereas all other videos should be previewed. In other examples, content users may specify rules on which content previews to provide.

In some examples, the content previews may be displayed in the out the panel adjacent to the organizational elements where the content associated with the preview is located. For example, a thumbnail of a graphic in section 2.4 may be displayed near the description of section 2.4.

Panel Navigation

In some examples, the panels and outline view may be user navigable using one or more user inputs. User inputs may include touch gestures of a touch screen display, mouse inputs, keyboard inputs, speech inputs (e.g., speech control inputs), and the like. For ease of description, touch inputs will be used in describing user interactivity with the outline view; however, one skilled in the art with the benefit of Applicants' disclosure will appreciate that inputs from other input devices and sources may be used.

Example touch gestures used on a touch screen display may include a one-finger swipe which may consist of a user pressing a finger on a particular point on the display and then sliding the finger across the display in a particular direction. Another example touch gesture used on a touch screen display may include a pinch touch gesture, which may consist of pinching together two fingers which are pressed on the display or un-pinching (or reverse pinching), which may consist of spreading two fingers which are pressed on the display. Yet another example touch gesture used on a touch screen display may include tapping or selecting, which may consist of briefly pressing the finger on the screen at a particular point.

Example user navigation features of the outline view and the panels include independent scrolling of the panels. For example, there may be too many organizational elements in a particular panel to display them all on one screen at the same time in a size that is comfortable for a viewer to read. As a result, the panels may display some of the organizational elements and hide others. In order to view the hidden organizational elements, the user may scroll through the list of organizational elements in the panel using one or more inputs (e.g., a swipe on a touch screen display). In some examples, if the panels are organized into one or more columns, the panels may be vertically scrollable. The panels may be independently scrollable in that scrolling one panel may not affect what is displayed on the other panel. For example, a user may scroll a chapter panel without affecting the sections displayed in the section panel until a selection is made in the chapter panel (at which point, the section panel would be updated to display the sections of the newly selected chapter).

Another example user navigation feature of the outline view includes the ability to scroll across panels in the outline view in order to navigate between the various panels. For example, if there are too many panels to display on the screen at one time (e.g., there are three panels in the outline view and only two can fit on the screen at one time), a user may use one or more inputs (e.g., a swipe) to scroll across the various panels to display the hidden panel or panels. In some examples, scrolling across the panels may be done in a perpendicular direction to the scrolling direction of the panels themselves. For example, if the panels are columns and if the individual panels scroll vertically, a user may scroll across the panels horizontally. Scrolling in a first direction may show panels narrower in organizational element scope showing panels with sub-sections or sub-sub-sections) and hide panels displaying broad organizational elements (e.g., chapters). Scrolling in a second direction opposite the first direction may hide panels of narrower scope and show panels of broader scope.

In some examples, the panel scrolling may be accompanied by a graphical transition. For example, the panel scrolling may be accomplished by using a swipe touch gesture. While a finger is moved across the panels, the panel in which the finger was initially pressed follows the motion of the finger as it is swiped over (and hides) another panel. As the panel in which the finger was initially pressed moves over the panel on which the finger is swiped, a new panel slides into position to occupy the space that the moved panel vacated.

The various organizational elements and content previews displayed in the panels may also be selectable in that tapping or otherwise selecting those elements may trigger certain actions on the part of the client software. For example, tapping an organizational element may cause other panels that show organizational elements of lower levels in the organizational hierarchy of the electronic work to update to show the children of the recently selected organizational element. For example, selecting a particular chapter may have the effect of displaying the sections within that chapter in the next panel (e.g., FIG. 1). In other examples, tapping an organizational element or content preview may cause the content corresponding to that organizational level to be displayed.

In some examples, tapping on an organizational element or content preview may have different effects based upon the panel in which it occurs. For example, tapping on an organizational element in a panel which displays high level organizational elements (e.g., chapter levels) may simply update what is displayed in other panels, whereas tapping or clicking organizational elements in panels depicting lower level organizational elements (e.g., sections or sub-sections) may cause the portion of the interactive content that corresponds to the tapped or clicked content section to be displayed. In other examples, tapping or clicking on an organizational element in a panel may cause the other displayed panels to slide to the right or left (and in some cases, a higher level panel may be demoted off of the screen) and an additional panel which features even lower level organizational elements, which may be child elements of the tapped or clicked organizational elements to be displayed. For video, audio, or other interactive content previews, clicking or tapping on them may cause the audio, video, or other interactive content to be directly played within the outline view. In other examples, clicking or tapping on them may take you directly to the content sections in which that content is located.

Example Outline View

Turning now to FIG. 1, an example outline view is shown with two panels 1010 and 1020 displayed as columns. In some examples, the outline view may be tailored to the screen size and dimensions of the client application. For example, on a tablet computer in a portrait orientation, the outline view may display two panels at a time, but on a larger widescreen client or on a tablet computer in a landscape orientation, the outline view may display three or more panels at a time. As previously described, other panels which are part of the outline view may be accessed by scrolling. The outline view of FIG. 1 shows a first panel 1010 which shows a broad view of the content at the highest possible organizational level, in the example of FIG. 1, it shows a panel showing a chapter organizational level and a list of the organizational elements at that level in the form of the various chapters. The organizational elements are displayed with both a chapter number and chapter title and content previews showing a thumbnail of an image in the chapter. The panel 1010 is vertically scrollable by utilizing a scrollbar or a finger swipe. In this way, the outline view may present the entire list of organizational elements at a large enough size to be properly visible. Organizational elements that are not presently visible may be made visible by scrolling up or down. In the example shown in FIG. 1, the user would scroll down to see chapters 5 and later (e.g., using a finger swipe). In the process of scrolling down to see chapter 5 or later chapters, the previous chapters may be hidden. To access previous chapters, the user would scroll upwards. The first chapter may be initially selected, and the organizational child elements of the chapters (e.g., the sections) may then be displayed in the second panel 1020.

The second panel 1020 may then display the organizational child elements of the organizational element (e.g., the chapter) selected in panel 1010 (e.g. chapter 3). If the user selects a different chapter, the second panel 1020 may switch to displaying the organizational child elements (and in some examples grand-child elements, great grand-child elements, and the like) of the newly selected chapter.

In some examples, a panel may be further divided into one or more panel sections based upon the organizational elements displayed in the panel. For example, the panel 1020 is separated into multiple panel sections 1030 and 1040. Each section corresponds to a particular organizational element. Panel section 1030 relates to one organizational element 1035 ("section 3.4") of the electronic content. Panel section 1040 relates to another organizational element 1050 ("section 3.5") of the electronic content. As previously described, each panel may contain multiple levels of the organizational hierarchy. Thus, child organizational elements, grand-child organizational elements, great-grand-child organizational elements and the like may be shown in the same panel and, in the example of FIG. 1, the panel section of its parent organizational element. For example, organizational element 1050 (e.g., "section 3.5") is shown, along with a child organizational element 1060 (sub-section labeled "AMINO ACID MONOMERS"), and a grand-child organizational element 1070 (sub-subsection labeled "Primary") of that organizational element. The structure of each panel and how many levels of organizational detail are shown may be described by a layout description, which will be described in more detail later in the disclosure. In some examples, the child elements of a particular organizational element may be displayed in the panel section along with the corresponding parent organizational element, as shown in FIG. 1.

Panel 1020 displays the title of the child and grand-child organizational elements of the selected chapter as well as various content previews. Panel 1020 displays thumbnail previews of images or figures 1080, 1082, 1084, 1086; videos 1090; slideshows 1110; and guided tours 1120, 1122 from the organizational level associated with the organizational element of the panel 1020 or panel sections 1030, 1040. Other content previews may be shown (depending on whether or not those content types are present in the organizational level). For example, panel section 1030 shows content previews 1100, 1102, and 1104 associated with three-dimensional models. Other examples may include Test Yourself previews, Slideline previews, and the like. Test Yourself electronic content may test a user's knowledge of the electronic content by showing an image with leader lines to various points of interest in the image with no labels. Test Yourself electronic content may test a user's knowledge of other portions of the electronic content by showing an image with obfuscated or empty labels attached by leader lines to various points of interest in an image. Users may test their knowledge of the content by guessing the obfuscated contents of the label, or by typing an answer into the empty label element. When the user has finished, the correct answers may be displayed. Slideline content is used to present a series of static images that relate to each other along a one-dimensional scale. Each image is represented on the scale as a keyframe (in some examples as a white dot). The user may either tap on the various keyframes or swipe along the slider bar to advance to the next position. A full description of different types of content is described in U.S. patent application Ser. No. 13/019,211 titled "SYSTEM AND METHODS FOR CROSS PLATFORM INTERACTIVE ELECTRONIC BOOKS," to MacInnis, et. al., filed on Feb. 1, 2011, which is incorporated herein by reference in its entirety.

Figure 2:
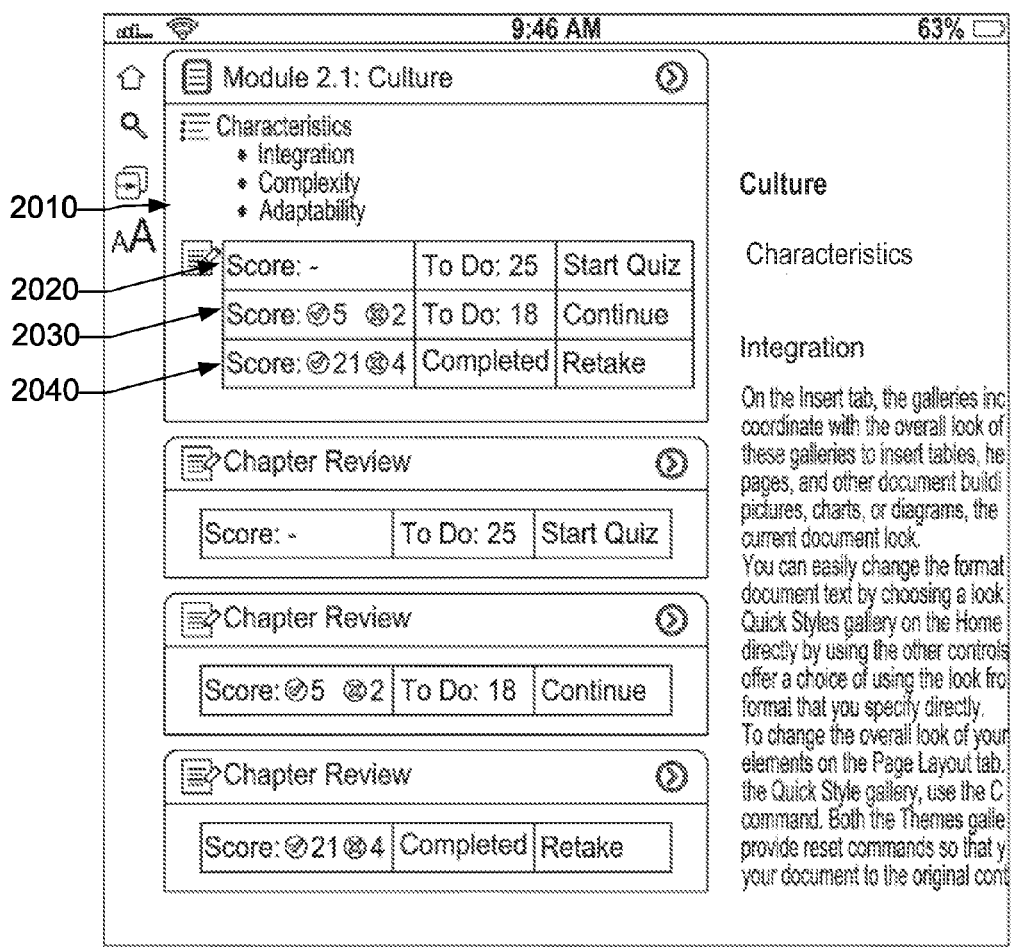
FIG. 2 shows an outline view, according to some examples of the present disclosure.

Another example is shown in FIG. 2. FIG. 2 shows panel section 2010 with three interactive assessment previews 2020, 2030, and 2040 showing the user's score, how many questions remain to be answered, and giving the user the option to start the assessment, continue the assessment, or, if the assessment has been finished, re-take the assessment.

In some examples, the interactive electronic content may provide social features for content users. For example, users may leave notes associated with one or more of the content sections for other content users. Another example social feature includes social highlights, which may allow users to share highlights with other users. A full listing of the various social features may be found in U.S. patent application Ser. No. 13/213,994 entitled "OBJECT ORIENTED INTERACTIONS," to MacInnis, et. al., filed Aug. 19, 2011, which is incorporated herein by reference in its entirety.

One or more of the outline view panels may display one or more of the social features or a preview of the social features. One or more of the panels may show social notes, social highlights, and other various social features that are associated with portions of the content to which the panel relates. These may be shown in full or as a preview. They may be placed in the outline view alongside the organizational elements and other previews, in the margins of a panel, in the margins of the outline view, as pop up boxes, as sticky notes, as a list view (e.g., showing the author and/or portions of the social note content), and the like. Clicking or tapping on the social feature may display the social feature or may jump the user to the interactive content portion to which the social feature relates. In some examples, only previously unviewed social interactions (e.g., social notes, highlights, or the like) may be displayed, thereby indicating a "new" interaction.

One or more of the panels may show statistics on one or more of the social features or statistics on the content user. For example, one or more of the panels may show a count of the number of social notes, a count of the number of social highlights, an indication of an average score for an assessment, and/or the like. These statistics may be limited to social features that are associated with the organizational level to which the panel pertains. That way, one or more users can see how many notes, highlights, or other social features are associated with a particular organizational level of the electronic content. In yet other examples, various sections of the outline view may show statistics related to a content user's use of the content. For example, the time spent reading a particular section, a quiz score received, whether or not the user has read a particular section, or an indication for another user or a teacher of an assigned reading section (and a checkbox or some other indication that the section has been read). In yet other examples, the statistics may relate to another content user's use of the work, or may be an aggregate of a group of content users' use of a work. For example, a panel may display an average time read based on statistics for a number of content users.

The various social features and statistics that are shown in the outline view may be limited to those social features left by the content user, by a particular group of content users, or by all content users. These groups may be self-selected (e.g., a group of friends who choose to follow each other and see each other's notes) or may be automatically selected (e.g., the user may be a member of a particular school class, the user may be in a particular group based on being in a particular geographical location, or the like). The content user may be able to customize which social features, and whose social interactions, are displayed on the outline view based on one or more user settings.

One or more of the panels may also show a reading location of one or more other users. For example, the content user may wish to see where other content users, or other content users who are members of a particular group, are presently reading or have already read. Reading location awareness is described in greater detail in U.S. patent application Ser. No. 12/731,656 entitled "System and Methods for Reading Location Awareness," to MacInnis, et al, filed on Mar. 25, 2010, which is hereby incorporated by reference in its entirety.

In still yet other examples, the various outline view levels may import external content from external websites. For example, the interactive electronic content may have links to external sites that may provide supplemental content. For example, definitions or other terminology may be linked to a Wikipedia page on the topic. The Wikipedia page may be linked into the outline view such that a portion (or the entire page) may be displayed. In other examples, a social note may be linked to a discussion on a social networking site and the discussion may be imported automatically and previewed.

In some examples, a content user may purchase some portions of the electronic content but not others. For example, a user may purchase certain chapters but not others. The outline view may still show the outline and preview for all the content, even if not purchased, but may distinguish the un-purchased content as un-purchased to indicate that the particular content is not available for full viewing. In some examples, a user may be presented with an opportunity to purchase the un-purchased content if the client application detects that the user is attempting to access a portion of the content that was not purchased. In some examples, the un-purchased content may be highlighted to the user as un-purchased by graying out the un-purchased content.

Figure 3:
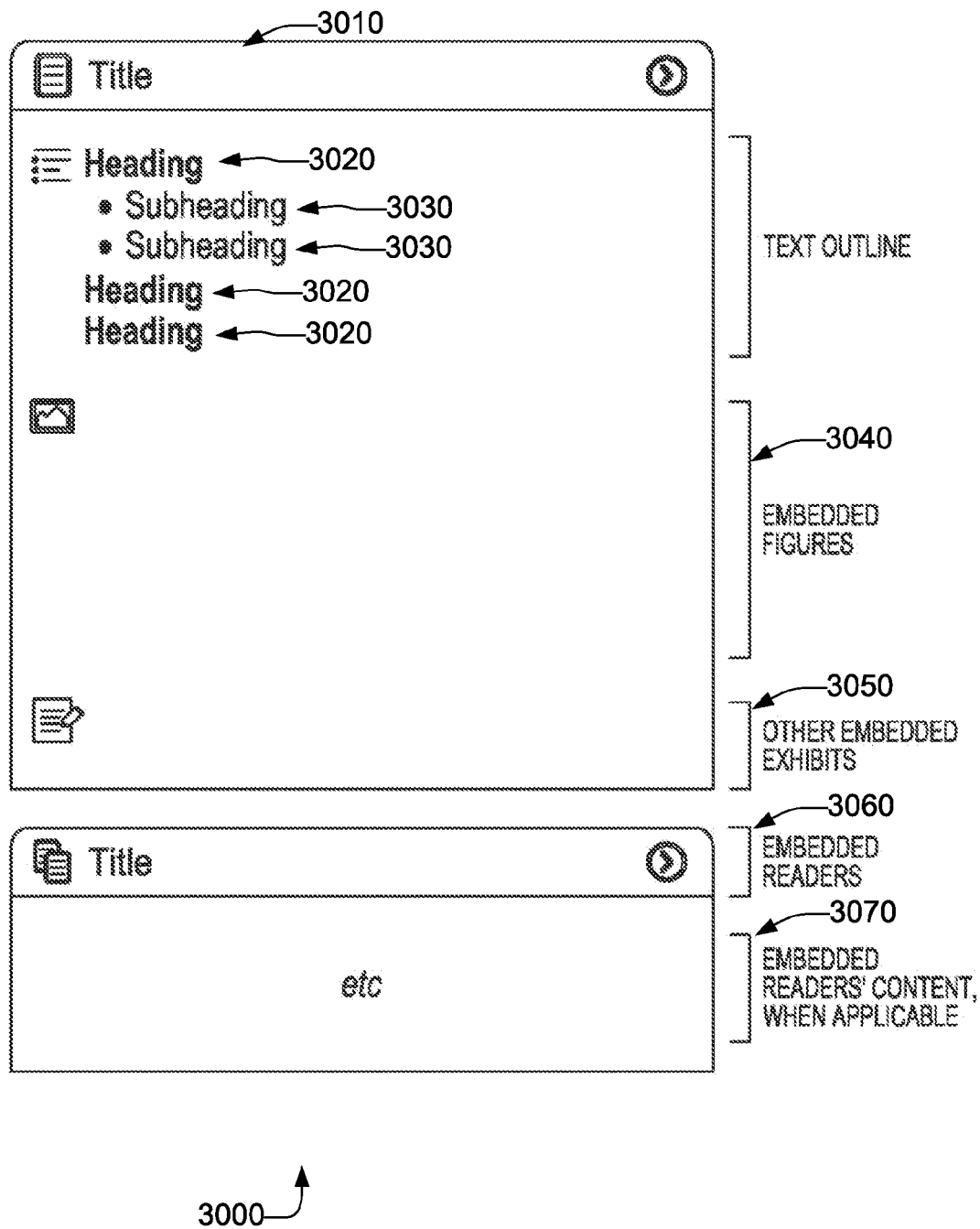
FIG. 3 shows a layout description of an outline view, according to some examples of the present disclosure.

In some examples, the various elements of a section of the panel may be organized according to a layout description. For example, FIG. 3 shows one example portion of a layout description 3000, which may describe a panel section such as panel sections 1030 and 1040. As shown, the highest organizational element to display within a section of a panel may be displayed on top at 3010 (e.g., a section heading). Child organizational elements 3020 and grand-child elements 3030 may also be shown. Various embedded figures 3040 may be placed after the various organizational elements. Other exhibits such as video, slideshows, audio, three-dimensional models, and the like may be displayed at 3050. Finally, embedded readers 3060 and their content 3070 may be displayed last. The layout description may include additional information such as the number of panels, the layout of those panels, the organizational levels described by each panel, and the like. One layout description may be used to describe all panels, but in other examples, multiple layout descriptions my be used to describe an outline view. Thus for example, layout description 3000 may be used for one panel and another layout description may be used for a different panel (e.g., panel 1010).

Figure 4:
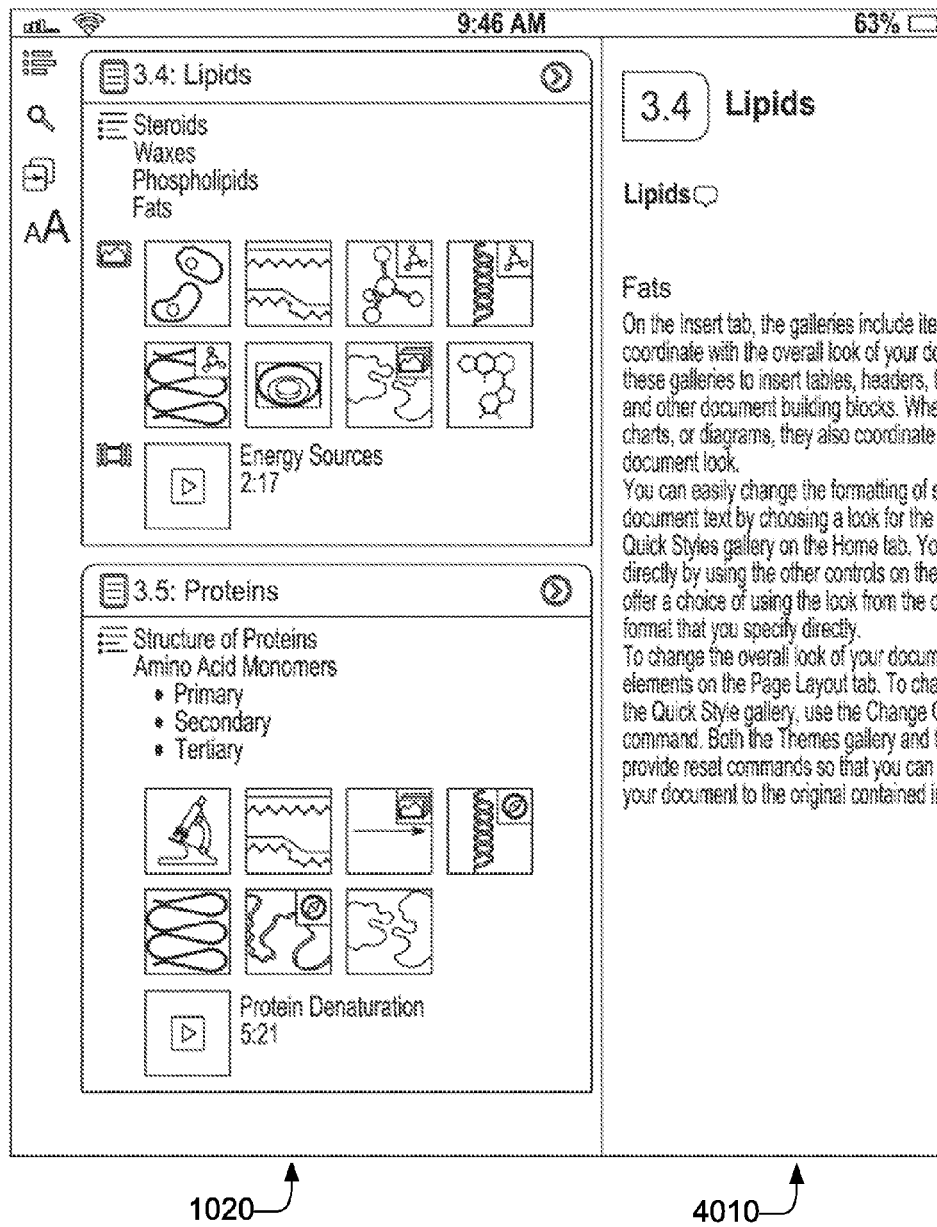
FIG. 4 shows an outline view, according to some examples of the present disclosure.

Turning back to FIG. 1, if a user swipes or scrolls across the outline to the right (note that the scrolling may be considered to the right even though a swipe input would move the finger to the left), an additional panel may be displayed (and the chapter panel may be demoted off of the screen if space is not available) that may display additional organizational elements that are children of the organizational element selected in panel 1020. In other examples, and as shown in FIG. 4, the actual content of the selected organizational elements or content preview may be displayed 4010 along with panel 1020. The content is shown partially obscured in FIG. 4, but in other examples it may be resized or the text may be re-flowed such that all the text appears in the column. A further swipe (from right to left) or other user input by the reader may cause the interactive electronic content to be displayed full screen. A swipe back or other user input to the left may show panel 1020 again, and a further swipe or user input may hide the content and show panel 1010 along with panel 1020 (e.g., FIG. 1). Thus the outline view may interact seamlessly with the presentation of the electronic content.

While two panels of outline view were shown in FIGS. 1-3, it will be appreciated by one skilled in the art with the benefit of Applicants' disclosure that additional panels may be added. For example, three panels may be shown. In other examples, less than three panels may be shown. For example, the chapter-level preview may link directly to a full-screen view of the content. Additionally, one skilled in the art with the benefit of Applicants' disclosure will appreciate that while the figures displayed the various panels as columns that the panels could be organized as rows as well.

Creating the Outline View

Figure 5:
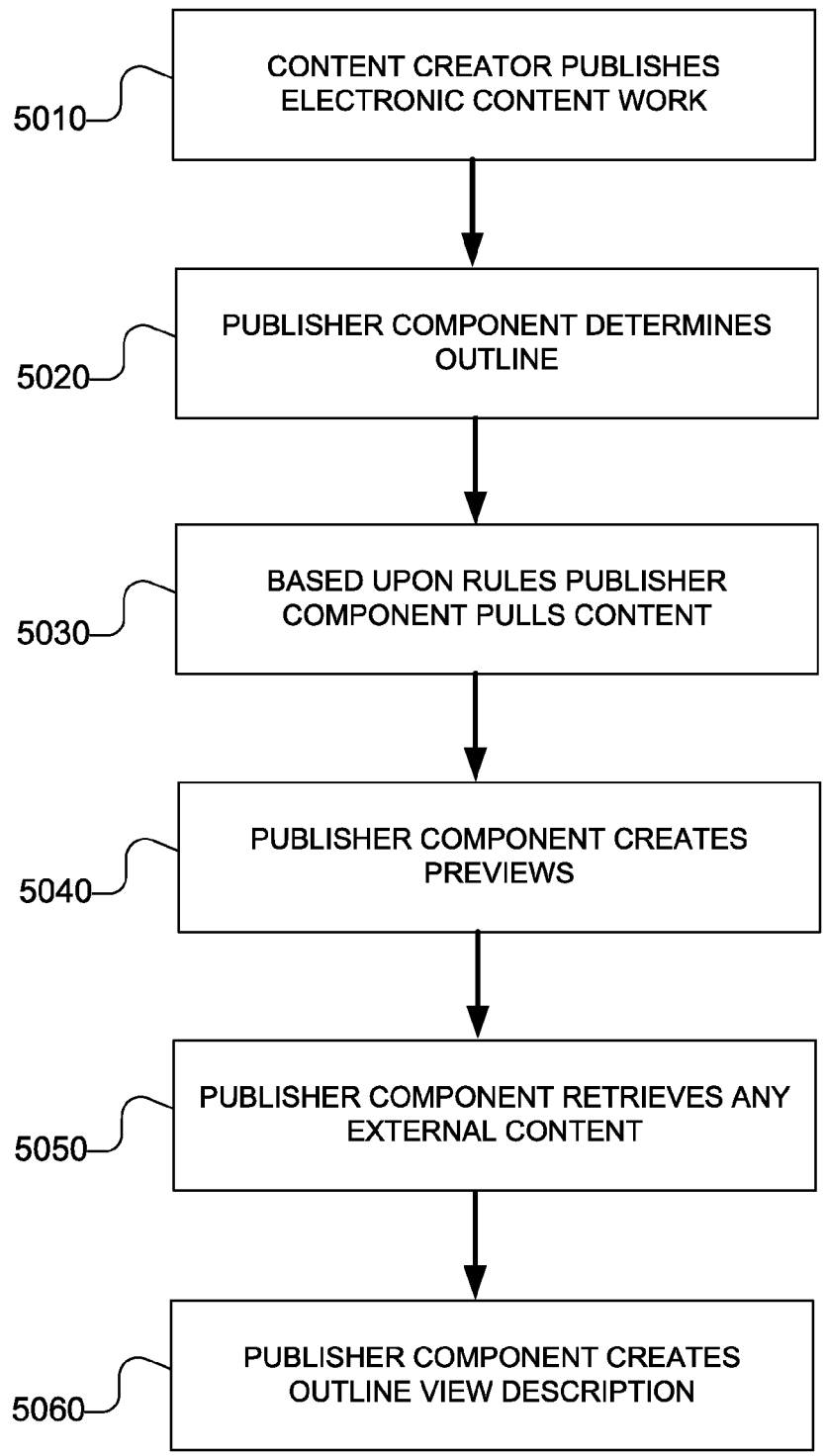
FIG. 5 shows a flowchart of a method of creating an outline view, according to some examples of the present disclosure.

Turning now to FIG. 5, an example method of creating an outline view is shown. At operation 5010, the content creator publishes the electronic content work using a publishing component. In some examples, publication of an interactive electronic work may include various processes and techniques to prepare the electronic content work for proper display and execution upon particular types of client devices. For example, the content may be developed as a platform-independent work, which is then automatically converted so as to be displayable on various disparate platforms. Example publication operations include resizing and reformatting the content so as to display properly on a particular client device.

Publication (or "building" the content) is a process by which a format independent representation of the content is transformed into a format dependent representation of the content. For example, the content may be customized for a particular client device (e.g., iPad) or for printing on a particular format (e.g., letter paper size, legal paper size, A4, or the like). This process may be done through various network based publication components, which may prompt the individual to input a number of various options including which target platforms to build the electronic content work for, whether the entire work is to be built or only selected portions, and the like. This conversion process may include changing the layout of the text based upon the available screen resolution or paper size, selecting or reformatting images, video or audio to work with the device or printing type (e.g., paper size, black and white vs. color, and the like), selecting one or more alternate content pieces based upon the capabilities of the device (e.g., inclusion of a particular video selected from a number of videos where the video is tailored to the performance capabilities of the machine or the video codecs or the like that are supported), and the like. In other examples, content that may not be displayed on a particular type of medium or device may be removed and replaced with alternative text, links to online resources to view such content, or the like. For example, if the publication converts the content into a format ready for hard-copy publication, videos may be replaced with boxes which display information about the content of the video and links which direct users to online versions of the video. The publication component may use one or more profiles of various target devices and media. These profiles specify the capabilities of the media and/or device. The publication component then publishes the electronic content by comparing the various content portions against the capabilities of the media or device, the electronic content requires device or media capabilities that are not present on the media or device, the content is removed, resized, replaced with compliant content, or the like. In some examples, the layout and pagination of the content may be changed. Text may also be adjusted so as to conform to the layout and pagination of the target media or device.

At operation 5020, the publisher component may determine the various organizational elements of the electronic content and how they are organized as an outline structure. In some examples, the content creator may provide to the publishing component the various organizational elements organized into an outline structure, and therefore, determining the organizational elements may comprise reading the provided structure. In other examples, the publisher component may determine part or all of the organizational elements and their organization based upon the interactive content itself.

To determine the organizational elements and their organization, various techniques may be used. In some examples, the electronic content may comprise a plurality of markup files. The publisher component may scan the plurality of files for one or more organizational elements by looking for one or more organizational element indicators. Organizational element indicators may be any data within the electronic content that may signal the presence of an organizational element to the publisher component. For example, if the electronic content is stored as a markup language, one or more markup tags may be organizational element indicators. Example indicator markup tags may include <h1>-<h6> tags, which indicate headings. Each heading may indicate the presence of one or more organizational elements; therefore, each <h1> tag may indicate a chapter organizational element and the like. The organizational element may be located in the content between the tags. Other organizational element indicators may include the organizational elements themselves. For example, by using textual clues and text matching algorithms to find and recognize organizational elements based on the wording in the organizational element, the format of the text (e.g., font size, layout, font type, bolded fonts, italicized fonts, underlined fonts, etc.), or a particular textual structure. For example, finding the text "Chapter 1" may indicate that the content after the text is the beginning of Chapter 1, that "Chapter 1" is an organizational element, and that "1" is an ordering. Similarly "Section 1.1" may indicate the first section in Chapter 1. The organizational elements in the electronic content may follow a predetermined format "Chapter 1 Introduction" specifies an organizational element—i.e., a chapter, the chapter number: "1" and the title: "Introduction"), thereby allowing for the easier identification of the various organizational elements. Likewise the publisher component may use the font size as an indicator. For example, a chapter may have its text in a larger size than surrounding text.

The organizational elements identified by the indicators are then copied from the electronic content and placed into an outline view description in the proper position in the outline. The proper position in the outline may be determined in a number of different ways. One way of determining the proper position in the outline utilizes the order in which the organizational elements are found. For example, the first <h1> element found may be the first chapter in the electronic work and any <h2>-<h6> elements before a subsequent <h1> element would be child organizational elements of the first <h1> element. Where the electronic content is stored as a plurality of markup files, the publisher component may provide an ordering of the files such that elements found in one file are ordered before elements found in other files. Such an ordering may include a hierarchical ordering such that one file may be ordered as a child of another file. In these cases, the organizational elements of the child file may be child organizational elements of the organizational elements of the parent file. The ordering may be specified in a list, as a filename ordering (e.g., a filename may contain an ordering such that file__1.xml may come before file__2.xml in the electronic content), metadata within the files (e.g., tags inside the files) or the like.

Another way of determining the proper positioning uses contextual clues from the organizational elements themselves. For example, if the organizational element is "Chapter 1," then the organizational element would come prior to an organizational element that is "Chapter 2," "Section 1.2" may then be the second section in Chapter 1. Generating the organizational structure may be assisted by a general outline description provided by the content creator that informs the publisher component of the general structure (e.g., that chapter is the broadest organizational level, that chapters contain sections and sections contain sub-sections, and the like) and, in some examples, a format of the organizational elements (e.g., that chapters are formatted as "CHAPTER"<chapter number><title>).

Once the outline is determined, the publisher component may identify content portions of the electronic content used to create the content previews at operation 5030. Once the content is identified, the previews may be created at operation 5040. These operations may be performed subsequent to identifying the outline, but in other examples may be performed as the outline is being determined. The identification of the content used to create the previews may be based upon one or more rules which may specify which types of content to preview. The rules may specify both the type of content to preview (or not to preview) and how the content is to be previewed. For example, the rules may specify that all non-textual content is to be previewed as a thumbnail image. In that case, the publisher component may search for all non-textual content and create thumbnail images for that non-textual content. The rules may also contain more complicated rules that break down the type of content and how the content is to be previewed as a function of organizational element or level. Thus for example, the type of content or how it is previewed may change depending on the organizational level or even the particular organizational element. In addition, the rules may also specify rules for specific instances of content portions. Thus a content creator may direct that certain content portions may be previewed while others are not.

At operation 5040, the publisher component may create the previews from the content identified based upon the instructions in the rules file. Creating the content previews may include resizing, reshaping, extracting a portion of the content, or otherwise adapting the content to fit the outline view panel on which it is to be placed in accordance with the rules file. For example, the rules may specify the size of each content preview (and in some examples, the size may vary based on content type). The content may be resized in order to match the size given (e.g., a thumbnail size). In other examples, the rules file may specify one or more transformations. For example, for video content, the content preview may be a still thumbnail image of a representative video frame. The representative video frame may be the first frame of the video, the last frame, a randomly chosen frame, a frame specified in the video content metadata, or a frame specified in the rules file. The representative video frame may then be resized. This is then the content preview for the video frame.

In some examples, the electronic content may have links to external content. This external content may be previewed in the same manner as content in the interactive content work. At operation 5050, the publisher component may retrieve any external content which may have been linked from the electronic content work and generate the appropriate previews. In other examples, the client device may have the responsibility of retrieving any external content and generating the previews as part of displaying the outline view.

At operation 5060, based upon the outline and the content previews, the publisher component may assemble the outline view as an outline view description. In some examples, the outline view description may contain a description of the outline including the one or more organizational elements along with the various content previews and a description of a location of the various content previews (e.g., what portion of the electronic content from which the preview originated). The client may then determine, based upon a layout description, how many panels are displayed and in which panels the various organizational levels are to be displayed. The layout description may be sent to the client separately from the outline view description (e.g., as a separate download or may be included in the client application or in the programming of the client application). In other examples, the outline view description may include the layout description. The layout description may specify the number of panels to include in the outline view, the level of organizational elements (e.g., whether chapters, sections, sub-sections) that should be included in each particular panel level, and in what order the elements should be placed (e.g., the layout—for example FIG. 3).

In some examples, the various content previews may be included as separate files from the outline view description, but in other examples they may be included as inline data. For example, if the outline view description is a markup file, the previews may be included inline in accordance with a data Uniform Resource Identifier (URI) scheme, A data URI scheme is a scheme that allows for various data types to be included in a markup page inline.

The publisher component may create the outline view description and include the outline view description as part of the electronic content work, which may be placed in an electronic store for download by one or more content users. In some examples, users that may have purchased previous versions of the electronic content may have updates to the outline views pushed directly to their client devices. Changes made to the electronic content and published may trigger a rebuild of the outline view. The modified outline view may then be made available for download by the client applications or may be pushed to the client application automatically.

Displaying the Outline View

Figure 6:
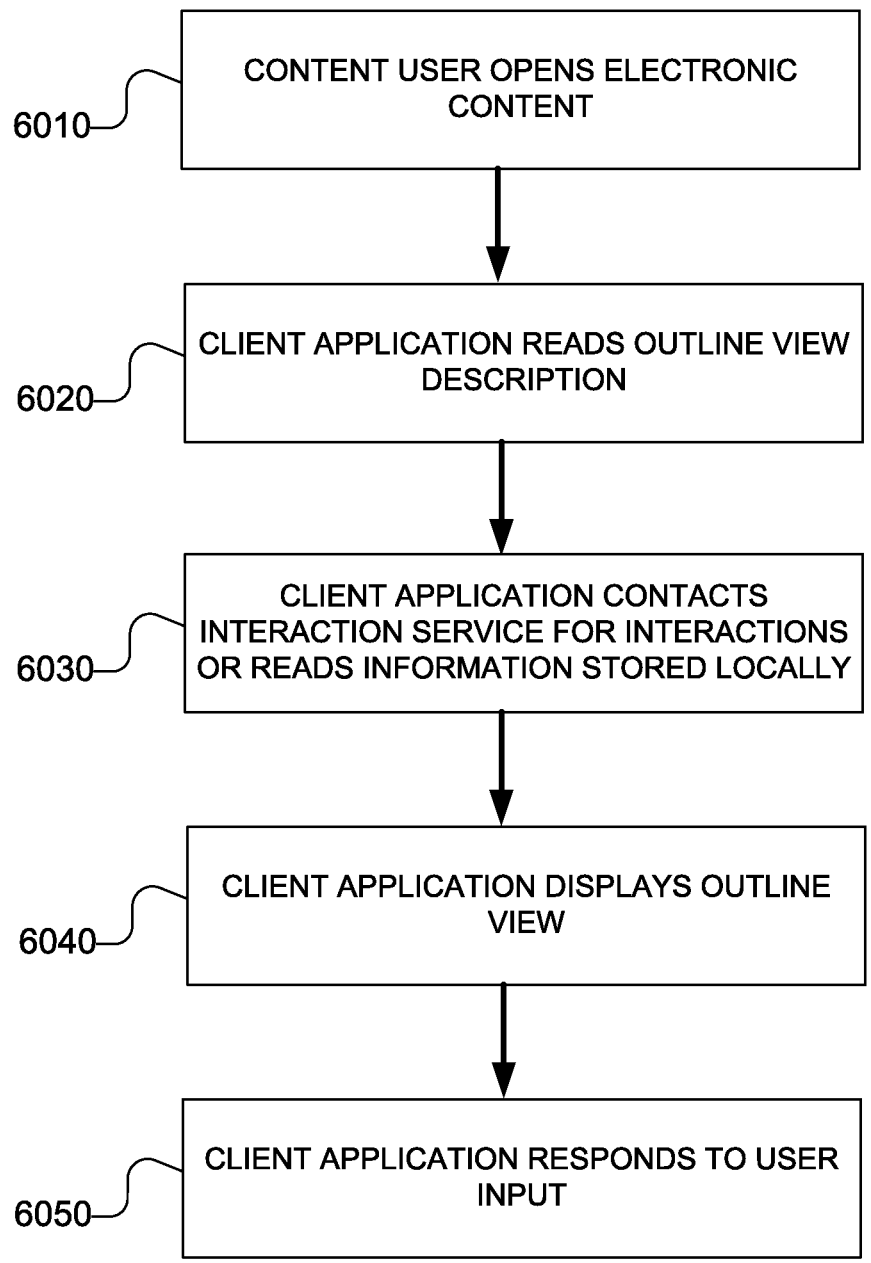
FIG. 6 shows a flowchart of a method of displaying an outline view, according to some examples of the present disclosure.

FIG. 6 shows a method for displaying the electronic outline. At operation 6010, the content user opens the electronic content using a client application executing on a client device. At operation 6020, the client application may read the outline view description created by the publisher component. In some examples, where interaction information is to be previewed, the outline view description may specify the particular interaction information to be included. Because the interaction information may be incomplete or unavailable at the time the outline view description is created, the client may need to retrieve interaction information. At operation 6030, the client application may contact an interaction service for interaction information and/or gather interaction information from the client device itself if the outline view calls for interaction information. This interaction information may then be turned into a preview based upon instructions in the outline view description.

At operation 6040, the outline view may be displayed based upon the outline view description and the layout description. The interaction information may be inserted into the outline view by the client application as appropriate where interaction previews are indicated by the outline view description. At operation 6050 the client handles and responds to the various user inputs to execute the outline view. For example, the client handles swiping and scrolling within a panel or across panels, selecting various organizational elements (and taking the various actions necessary in response to the selections) and the like.

Example Outline View System

Figure 7:
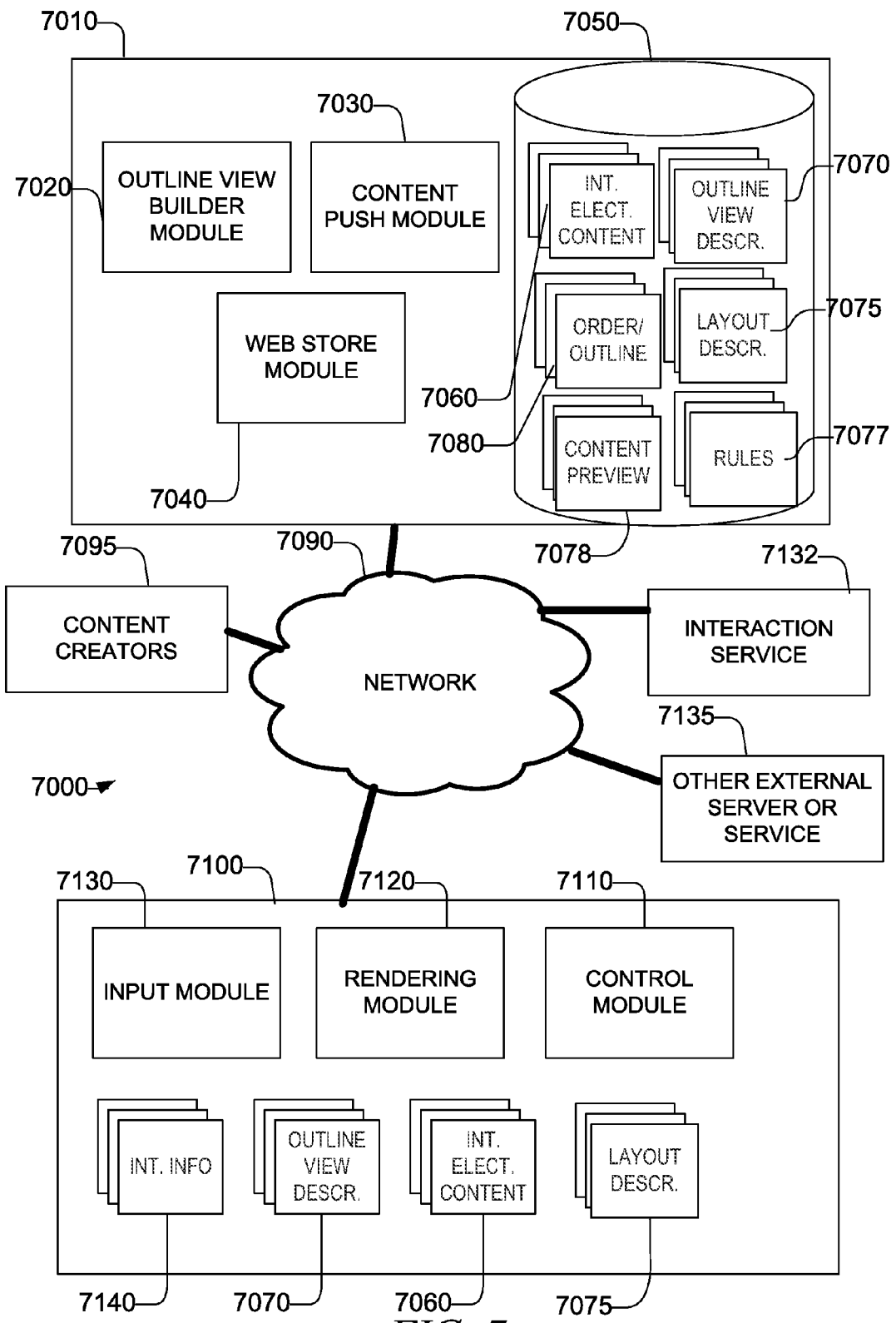
FIG. 7 shows a schematic of an outline view system, according to some examples of the present disclosure.

FIG. 7 shows a system 7000 for creating and displaying outline views according to some examples. A content creator 7095 may access a publisher module component 7010 across a network 7090 in order to create and publish interactive electronic content 7060 and create and publish updates to the interactive electronic content 7060. As part of the publication process, an outline view description 7070 may be created automatically by the outline view builder module 7020.

Publisher module or component 7010 may be a network addressable component which may execute on one or more computing devices and include outline view builder module 7020, content push module 7030, web store module 7040, and data store 7050. Data store 7050 may contain one or more data items including the interactive electronic content 7060, the outline view description (after its creation) 7070, and in some examples, an outline or content order 7080, layout description 7075, rules 7077, and one or more content previews 7078 (after their creation). Data store 7050 may be any device that allows the publisher module 7010 to store the one or more data items for a non-transitory duration. In some examples, data store 7050 may be, or include, a relational database and be or include one or more data storage devices (e.g., magnetic, optical, solid state, tape, or other storage devices).

Outline view builder module 7020 may take the interactive electronic content 7060 and create an outline view description 7070 and one or more content previews 7078 from it based upon information in the interactive electronic content 7060 itself (e.g., markup tags), outline or content order 7080, rules 7077, and/or layout description 7075 according to the methods previously described. Outline or content order 7080 specifies any information necessary for outline view builder module 7020 to determine an outline for the electronic content. In some examples, the outline or content order 7080 may be specified by the content creator. In other examples, the outline or content order 7080 may specify information used by the outline view builder module 7020 to extract the various organizational elements from the interactive electronic content 7060 and may include an ordering schema of one or more files constituting the interactive electronic work, a series of formatting rules for the organizational elements to allow for their identification (e.g., each chapter should be of the form: "Chapter"<chapter number><title>), a relationship between one or more markup tags and associated organizational elements (e.g., all <h1> tags are chapter organizational elements, and the like), partial outlines, and/or the like.

The completed outline view description 7070 and content previews 7078 may be stored in the data store 7050 for later download or push to a content user running client application 7100. In some examples, one or more of the content previews 7078 may be included in the outline view description 7070 as inline data. Additionally, in some examples, the layout description 7075 may be included as part of the outline view description 7070. Rules 7077 may be one or more rules specifying the various rules for creating content previews. Layout description 7075 may specify the layout and format of the outline views including the number of panels, the level of organizational detail displayed on each panel, and the like.

Network 7090 may be any computer network that may be used to allow data communications between publisher module 7010 and client application 7100. Network may be or include the Internet, Wide Area Network (WAN), Local Area Network (LAN), Cellular Network (e.g., 2G, 3G, 4G networks such as UMTS, GPRS, GSM, LTE, CDMA, CDMA 1x, CDMA2000, or the like), Wi-Fi networks (e.g., 802.11 networks), or the like.

Web store module 7040 may provide an electronic store accessible by one or more client applications 7100 across network 7090. Client applications 7100 may be executable on one or more client devices. Client devices may include any device capable of displaying the interactive electronic content and the outline view. Devices may include desktop computers, laptop computers, tablet computers, cellphones, smart phones, network appliances, or the like. Exemplary types of client devices may include an IPAD™ developed by Apple. Inc., of Cupertino Calif., XOOM™ developed by Motorola, Inc., Schaumberg Ill., GALAXY TAB developed by Samsung, Inc., of South Korea, or the like. Client applications 7100 may be any application that is capable of displaying and executing the outline view and the interactive electronic content on a particular client device.

In some examples, the client application 7100 may download the interactive electronic content 7060 and the outline view description 7070 from the web store module 7040 over network 7090. In some examples, a payment may be required before a user may download the interactive electronic content 7060. In other examples, the interactive electronic content and the outline view may be pushed to the client application by content push module 7030 over network 7090. This may be as a result of an update to the interactive electronic content work 7060 or outline view description 7070. In some examples, a content user may only purchase part of the interactive electronic content. For example, the content user may only download one or more chapters, sections, pages, or the like. The entire outline view 7070 and all content previews 7078 may be downloaded to the client application regardless of the amount purchased in order to show the organization of the entire work. The parts that are not purchased may be grayed out (or otherwise distinguished from purchased sections). If a content user attempts to view the content corresponding to the grayed out sections of the outline view, the client application may prompt the user to purchase the content.

Client application 7100 may have a control module 7110, which may load and display an outline view based on the outline view description 7070, interaction information 7140, and in some examples (where it is not included in the outline view description 7070), the layout description 7075 in response to one or more user inputs handled by the input module. Control module 7110 may cause the outline view to be displayed by issuing one or more commands to the rendering module 7120. The control module 7110 may also update the various panels in response to selections and scrolling, and load the appropriate sections of the interactive electronic content when a user selects one or more of the organizational elements in the outline view. Control module 7110 may also contact interaction service 7132 in order to download interaction information 7140 (e.g., information on social features—for example, social notes from other users and the like) associated with other content users for presentation within the outline view where indicated. Control module 7110 may also utilize interactions and usage information generated on the client application 7100 in the outline view.

Rendering module 7120 may take one or more instructions or directions from control module 7110 and render the interactive electronic content and the outline view on a display of the client device. Input module 7130 may detect and process one or more inputs (including processing touch based inputs) and pass along information on the user input to the control module 7110. The control module 7110 may process the user inputs and update the displayed interactive electronic content 7060 and/or the displayed outline view description 7070 accordingly.

Interaction information 7140 may store information regarding social features created by the current user of the client application 7100 and information on social features created by other users of the client application 7100 received from interaction service 7132. In some examples, control module 7110 may contact one or more other external servers or services 7135 to obtain data to include in the outline view. Example services include one or more social networking services (e.g., FACEBOOK®, LINKEDIN®, or the like), network based reference sources (e.g., WIKIPEDIA, etc.), servers maintained by the content creators that may provide supplemental content, or the like.

In some examples, the outline view description 7070, the interactive electronic content 7060, interaction information 7140, and layout description 7075 may be stored in the client device in transitory or non-transitory memory. Example memory includes ROM, RAM, FLASH, Hard Drive storage, SSD storage, or the like. In yet other examples, the interactive electronic content and/or the outline view may be streamed from interaction service 7132, publisher module 7010, or some other server over network 7090.

Various examples herein may discuss interactive electronic content. In some examples, interactive electronic content may be information, experiences, and idea expressions that may provide value for an end user and are stored electronically. In some examples, the electronic content may be educational, recreational, informative, and/or used to advertise. The ideas and expressions of the electronic content may be conveyed to a user through the use of one or more text, graphic, audio, visual, and/or audiovisual elements. In some examples, the electronic content may include electronic textbooks, electronic pamphlets, electronic workbooks, e-books, and the like. In some examples, the electronic content may not be a complete work, but may be portions of a work. Electronic content may be stored according to any number of or combination of electronic formats including markup language files (extensible markup language (XML), hypertext markup language (HTML), Cascading Style Sheets (CSS), or the like), ePUB (a free open source e-book standard developed by the International Digital Publishing Forum), graphics interchange format (GIF), portable network graphics (PNG), joint photographic experts group format (JPEG), exchangeable image file format (EXIF), tagged image file format (TIFF), raw format, bitmap (bmp), scalable vector graphics (SVG), postscript (PS), portable document format (PDF), shockwave flash (SWF), Waveform Audio File Format (WAV) format, Motion Picture Experts Group (MPEG) I, II, III, IV, Apple lossless (m4a), and the like.

While various examples described herein generate the outline view at a publisher component, one skilled in the art with the benefit of Applicants' disclosure will understand that such outline views may be generated on the client application 7100 either in advance or on the fly at runtime.

Example Client Device

Figure 8:
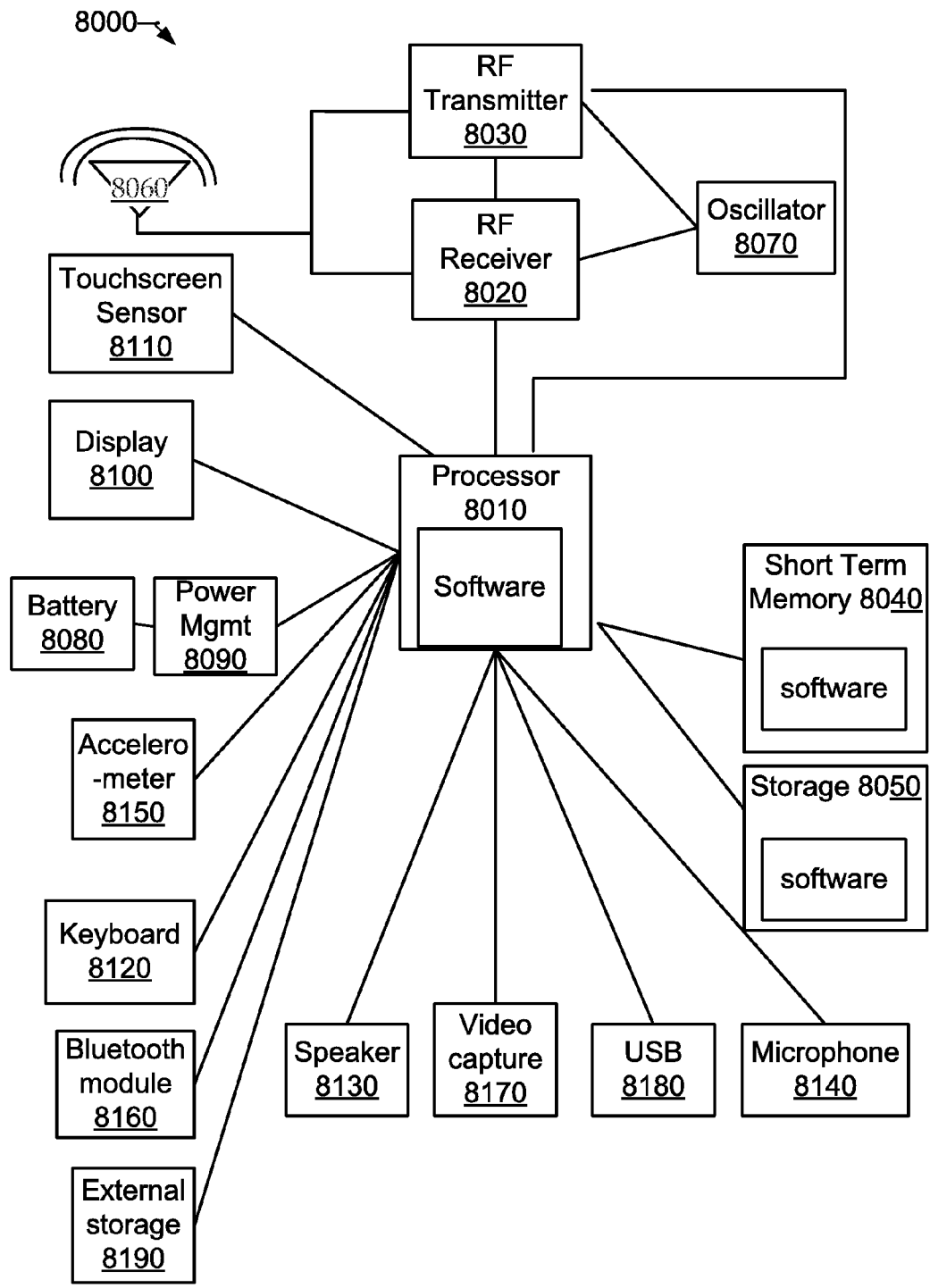
FIG. 8 shows a schematic of an example client device, according to some examples of the present disclosure.

Client application may be executable on various client devices. Client devices may include any electronic device capable of processing, displaying, and updating the outline view and processing the interactive electronic content and displaying it so as to properly convey the information, experiences, and idea expressions which are embodied in the electronic representation of the content in order to provide value for an end user. Examples of electronic devices include desktop computers, laptop computers, server computers, cellphones, smart phones, tablet computers, computer game consoles, portable computer gaming consoles, media players, portable media players, other mobile devices, and the like. FIG. 8 shows one example of such a device 8000 in the form of an electronic device. Processor 8010 may control the overall functions of the electronic device such as running applications and controlling peripherals. Processor 8010 may be any type of processor, including Reduced instruction Set Computing ("RISC"), Complex Instruction Set Computing ("CISC"), Very Long Instruction Word ("VLIW"), Minimal instruction Set Computer ("MISC"), One instruction Set Computer ("OISC"), and the like. Processor 8010 may be or include a Digital Signal Processor (DSP). Processor 8010 may communicate with RF receiver 8020 and RF transmitter 8030 to transmit and receive wireless signals such as cellular, Bluetooth, and Wi-Fi signals. Processor 8010 may use short term memory 8040 to store operating instructions and to help in the execution of the operating instructions (e.g., such as the temporary storage of calculations and the like.) Processor 8010 may also use non-transitory storage 8050 to store and read instructions, files, and other data that requires long term, non-volatile storage.

RF Receiver 8020 and RF Transmitter 8030 may send signals to the antenna 8060. RF transmitter 8030 contains all the necessary functionality for transmitting radio frequency signals via antenna 8060 given a baseband signal sent from Processor 8010. RF transmitter 8030 may contain an amplifier to amplify signals before supplying the signal to antenna 8060. RF transmitter 8030 and RF Receiver 8020 are capable of transmitting and receiving radio frequency signals of any frequency including, microwave frequency bands (0.3 to 70 GHz), which include cellular telecommunications, WLAN, and WWAN frequencies. Oscillator 8070 may provide a frequency pulse to both RF Receiver 8020 and RF Transmitter 8030.

Device 8000 may include a battery or other power source 8080 with associated power management process or module 8090. Power management module 8090 distributes power from the battery 8080 to the other various components. Power management module 8090 may also convert the power from battery 8080 to match the needs of the various components. Power may also be derived from alternating or direct current supplied from a power network.

Processor 8010 may communicate and control other peripherals, such as LCD display 8100 with associated touch screen sensor 8110. Processor 8010 causes images to be displayed on LCD display 8100 and receives input from the touch screen sensor 8110 when a user presses on the touch-screen display. In some examples, touch screen sensor 8110 may be a multi-touch sensor capable of distinguishing and processing gestures.

Processor 8010 may receive input from a physical keyboard 8120. In other examples, the device 8000 may utilize a touch screen keyboard using LCD display 8100 and touch screen sensor 8110. Processor 8010 may produce audio output and other alerts that are played on the speaker 8130. Speaker 8130 may also be used to play voices (in the case of a voice phone call) that have been received from RF receiver 8020 and been decoded by processor 8010. Microphone 8140 may be used to transmit a voice for a voice call conversation to Processor 8010 for subsequent encoding and transmission using RF Transmitter 8030. Microphone 8140 may also be used as an input device for commands using voice processing software. Accelerometer 8150 provides input on the motion of the device 8000 to processor 8010. Accelerometer 8150 may be used in motion sensitive applications. Bluetooth module 8160 may be used to communicate with Bluetooth-enabled external devices. Video capture device 8170 may be a still or moving picture image capture device or both. Video capture device 8170 is controlled by processor 8010 and may take and store photos and videos, and may be used in conjunction with microphone 8140 to capture audio along with video. USE port 8180 enables external connections to other devices supporting the USE standard and charging capabilities. USE port 8180 may include all the functionality to connect to, and establish a connection with, an external device aver USB. External storage module 8190 may include any form of removable physical storage media such as a flash drive, micro SD card, SD card, Memory Stick, and the like. External storage module 8190 may include all the functionality needed to interface with these media.

Modules Components and Logic

Certain embodiments are described herein as including logic or a number of components, modules, or mechanisms. Modules or components may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors, including processor 8010, may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FTGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server arm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g.; a computer program tangibly embodied in an information carrier, e.g., in a machine readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-atone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware a combination of software and a programmable processor), or a combination of permanently and temporarily configured hardware may be a design choice. Below are set out hardware (e.g., machine) and software architectures that may be deployed, in various example embodiments.

Example Machine Implementation

Figure 9:
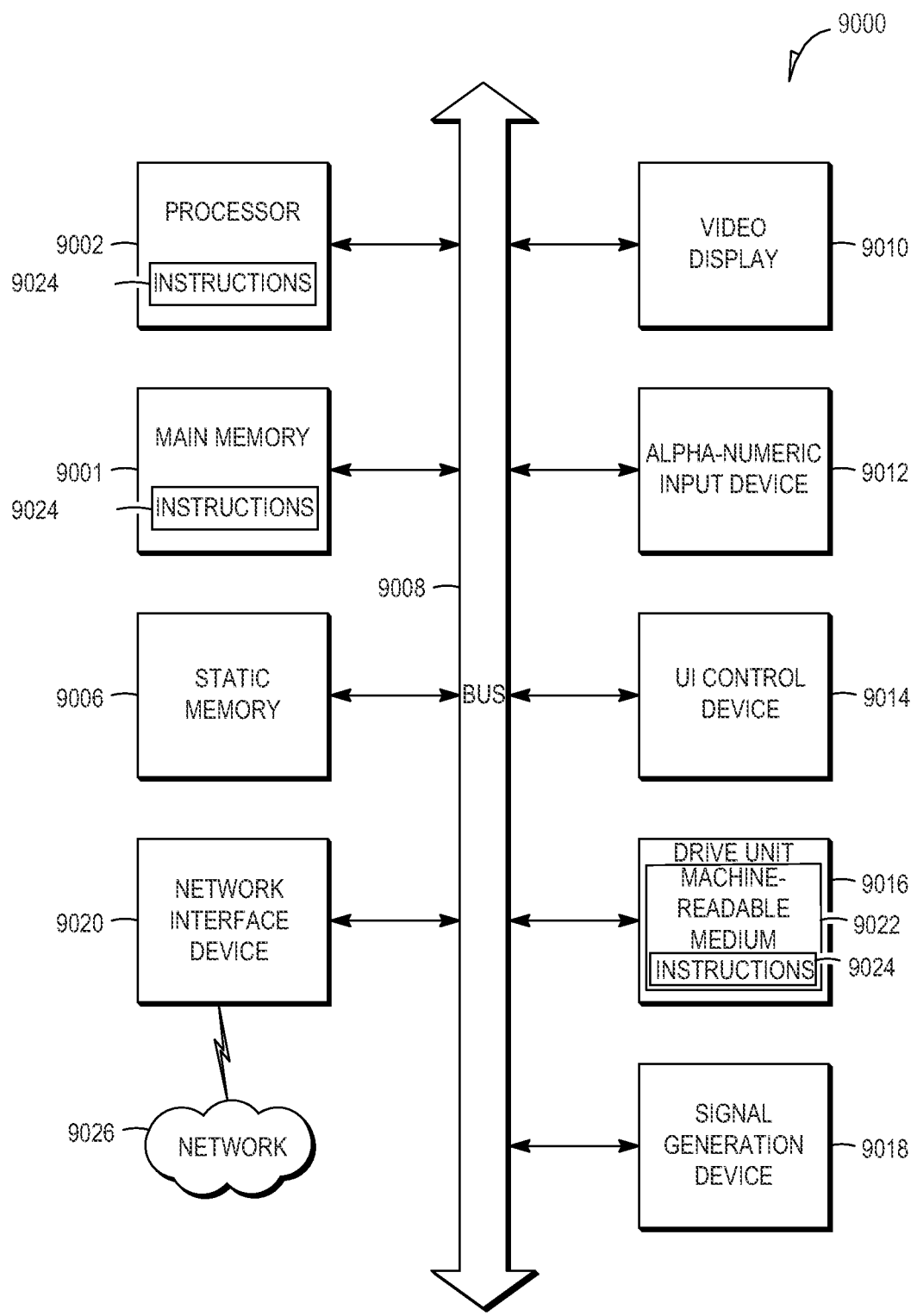
FIG. 9 shows a schematic of a machine implementation, according to some examples of the present disclosure.

FIG. 9 shows a diagrammatic representation of a machine in the example form of a computer system 9000 within which a set of instructions for causing the machine to perform any one or more of the methods, processes, operations, or methodologies discussed herein may be executed. In some examples the computer system 9000 may be client device 8000 or include one or more of the components of client device 8000. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments may also be practiced in distributed system environments where local and remote computer systems which that are linked (e.g., either by hardwired, wireless, or a combination of hardwired and wireless connections) through a network, both perform tasks. In a distributed system environment, program modules may be located in both local and remote memory-storage devices (see below).

The example computer system 9000 includes a processor 9002 (e.g., a Central Processing Unit (CPU), a Graphics Processing Unit (GPU) or both), a main memory 9001 and a static memory 9006, which communicate with each other via a bus 9008. The computer system 9000 may further include a video display unit 9010 (e.g., a Liquid Crystal Display (LCD) or a Cathode Ray Tube (CRT)). The computer system 9000 also includes an alphanumeric input device 9012 (e.g., a keyboard), a User Interface (UI) controller 9014 (e.g., a mouse), a disk drive unit 9016, a signal generation device 9018 (e.g., a speaker) and a network interface device 9020 (e.g., a transmitter).

The disk drive unit 9016 includes a machine-readable medium 9022 on which is stored one or more sets of instructions 9024 and data structures (e.g., software) embodying or used by any one or more of the methodologies or functions illustrated herein. The software may also reside, completely or at least partially, within the main memory 9001 and/or within the processor 9002 during execution thereof by the computer system 9000, with the main memory 9001 and the processor 9002 also constituting machine-readable media.

The instructions 9024 may further be transmitted or received over a network 9026 via the network interface device 9020 using any one of a number of well-known transfer protocols HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, and optical and magnetic medium.

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

Additional Notes and Examples

Disclosed in some examples is a method of presenting an outline view, the method including displaying a first user navigable graphical panel, the first panel displaying first organizational elements corresponding to a first outline level of an electronic content work; displaying a second user navigable graphical panel, the second panel displaying one or more child organizational elements of a selected first organizational element, with the child organizational elements corresponding to a second outline level of the electronic content work; and displaying one or more content previews of content within the electronic content work in the first or second panel, the content previews corresponding to the first or second outline levels of the electronic content work, respectively.

Disclosed in other examples is a system for presenting an outline view, the system including a control module configured to display a first user navigable graphical panel, the first panel displaying first organizational elements corresponding to a first outline level of an electronic content work; display a second user navigable graphical panel, the second panel displaying one or more child organizational elements of a selected first organizational element, with the child organizational elements corresponding to a second outline level of the electronic content work; and display one or more content previews of content within the electronic content work in the first or second panel, the content previews corresponding to the first or second outline levels of the electronic content work, respectively.

Disclosed in yet other examples is a machine-readable medium, the machine-readable medium including instructions, which when performed by a machine, cause the machine to perform certain operations. The operations may include displaying a first user navigable graphical panel, the first panel displaying first organizational elements corresponding to a first outline level of an electronic content work; displaying a second user navigable graphical panel, the second panel displaying one or more child organizational elements of a selected first organizational element, with the child organizational elements corresponding to a second outline level of the electronic content work; and displaying one or more content previews of content within the electronic content work in the first or second panel, the content previews corresponding to the first or second outline levels of the electronic content work, respectively.

Disclosed in some examples is a method of creating an outline view, the method including determining for an electronic content work a plurality of organizational elements associated with a plurality of outline levels of the electronic content work using one or more computer processors; creating one or more content previews from portions of the electronic content work, the one or more content previews associated with a particular organizational element; and creating an outline view description from the plurality of organizational elements and the one or more content previews, the outline view description providing instructions to a client application for displaying the plurality of organizational elements and one or more content previews in a plurality of graphical panels.

Disclosed in other examples is a system for creating an outline view, the system including an outline view builder module configured to: determine for an electronic content work a plurality of organizational elements associated with a plurality of outline levels of the electronic content work using one or more computer processors; create one or more content previews from portions of the electronic content work, the one or more content previews associated with a particular organizational element; and create an outline view description from the plurality of organizational elements and the one or more content previews, the outline view description providing instructions to a client application for displaying the plurality of organizational elements and one or more content previews in a plurality of graphical panels.

Disclosed in yet other examples is a machine-readable medium, the machine-readable medium including instructions, which when performed by a machine, cause the machine to perform certain operations. The operations may include determining for an electronic content work a plurality of organizational elements associated with a plurality of outline levels of the electronic content work using one or more computer processors; creating one or more content previews from portions of the electronic content work, the one or more content previews associated with a particular organizational element; and creating an outline view description from the plurality of organizational elements and the one or more content previews, the outline view description providing instructions to a client application for displaying the plurality of organizational elements and one or more content previews in a plurality of graphical panels.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," and the like are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method of presenting an outline view of an electronic document, the method comprising:

displaying, on a display of a client device, first ones of a plurality of organizational elements of the electronic document in a first user navigable graphical panel, said first ones of said organizational elements corresponding to a first outline level of the electronic document;

displaying, on the display of the client device and responsive to user selection of one of the first organizational elements corresponding to the first outline level of the electronic document, one or more child organizational elements of the selected first organizational element in a second user navigable graphical panel, the child organizational elements corresponding to a second outline level of the electronic document;

displaying, on the display of the client device and responsive to user navigation interactions with the child organizational elements in the second user navigable graphical panel, one or more content previews of content within the electronic document, the content previews being displayed within the second user navigable graphical panel according to currently displayed ones of the organizational elements of the second outline levels of the electronic document, wherein the content previews include summaries of one or more social features associated with the electronic document;

responsive to user navigation actions involving the first organizational elements in the first user navigable graphical panel, reconfiguring display of one or more of the child organizational elements in the second user navigable graphical panel, but preserving layout and configuration of the first outline level of the electronic document as displayed in the first user navigable graphical panel; and responsive to a user swiping the second user navigable graphical panel in a first direction, hiding the first user navigable graphical panel under the second user navigable graphical panel and displaying the second user navigable graphical panel and a third user navigable graphical panel, the third user navigable graphical panel being displayed in a space formerly occupied by the second user navigable graphical panel and displaying therein electronic content of the electronic document associated with the selected child organizational element in the second user navigable graphical panel.

2. The method of claim 1, wherein responsive to a change in the selected first organizational element to a newly selected first organizational element, causing to be displayed one or more child organizational elements of the newly selected first organizational element in the second user navigable panel.

3. The method of claim 1, wherein the first and second user navigable graphical panels are independently scrollable.

4. The method of claim 1, further comprising:
responsive to a user moving the second user navigable panel in a second direction, the second direction being opposite of the first direction, hiding the third user navigable panel and displaying the first and second user navigable panels.

5. The method of claim 1, further comprising:
responsive to a user dragging the third user navigable panel in the first direction again, hiding the second user navigable panel and displaying a full screen version of the third user navigable panel on the client device.

6. A method of presenting an outline view of an electronic document, comprising
displaying, on a screen of an electronic device, an outline view of an electronic document, said electronic document composed of interactive electronic content organized into a directed graph structure, said outline view being displayed as a plurality of organizational levels, each organizational level containing one or more organizational elements, each respective organizational element describing one instance of a division of the electronic document within a respective parent organizational level, the organizational levels thereby being defined such that the associated organizational elements within each successive organizational level divide the electronic document into narrower and narrower portions;

displaying on the screen of the electronic device, as part of said outline view, a first panel of a graphical user interface, the first panel including a plurality of organizational elements of a first organizational level of the plurality of organizational levels, the first panel occupying a first column of the screen of the electronic device and being vertically scrollable by a user interacting with the electronic device through the graphical user interface;

responsive to selection of a first one of the plurality of organizational elements in the first panel, displaying on the screen of the electronic device, as part of said outline view, a second panel, the second panel including a plurality of child organizational elements of the first organizational element of the plurality of organizational elements of the first organizational level, the second panel occupying a second column adjacent the first column on the screen and being vertically scrollable by a user interacting with the electronic device through the graphical user interface; and responsive to selection of a first one of the plurality of child organizational elements in the second panel, displaying on the screen of the electronic device, as part of said outline view, a third panel, the third panel including content of the electronic document associated with the selected first one of the plurality of child organizational elements, the third panel occupying a third column adjacent the second column on the screen and being vertically scrollable by a user interacting with the electronic device through the graphical user interface, wherein, the content includes summaries of one or more social features associated with the electronic document, the first, second and third panels are each independent elements of the graphical user interface, the first and second panels each contain one or more previews of content of the electronic document, the previews being displayed adjacent the organizational elements in which they are contained in the electronic document, and each panel being responsive to user interactions with the outline view such that user selection actions concerning organizational elements in the first panel cause reconfigurations of the display of the second panel, and user selection actions concerning organizational elements in the second panel cause reconfiguration of the display of the third panel, but layouts and configuration of a respective panel in which the user selection actions are performed are preserved across said user selection actions.

7. The method of claim 6, wherein scrolling in a first direction within the graphical user interface reveals panels including organizational elements narrower in scope than those organizational elements displayed on the screen of the electronic device prior to said scrolling and hides panels including organizational elements of broader scope than those subsequently displayed on the screen, and scrolling within the graphical user interface in a second direction opposite the first direction hides the panels including organizational elements of narrower scope and shows the panels including organizational elements of broader scope.

* * * * *